May 8, 1956  I. E. WIEGERS ET AL  2,744,748
ZERO SCALE SPRING
Filed Dec. 22, 1952  2 Sheets-Sheet 2
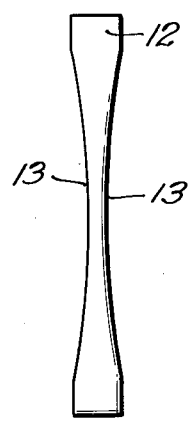
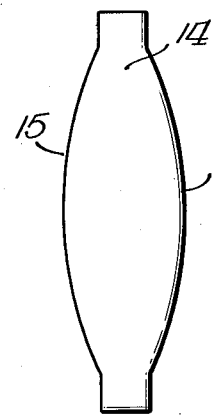
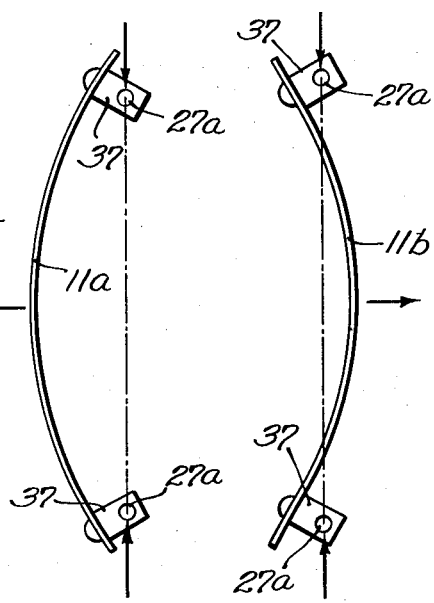
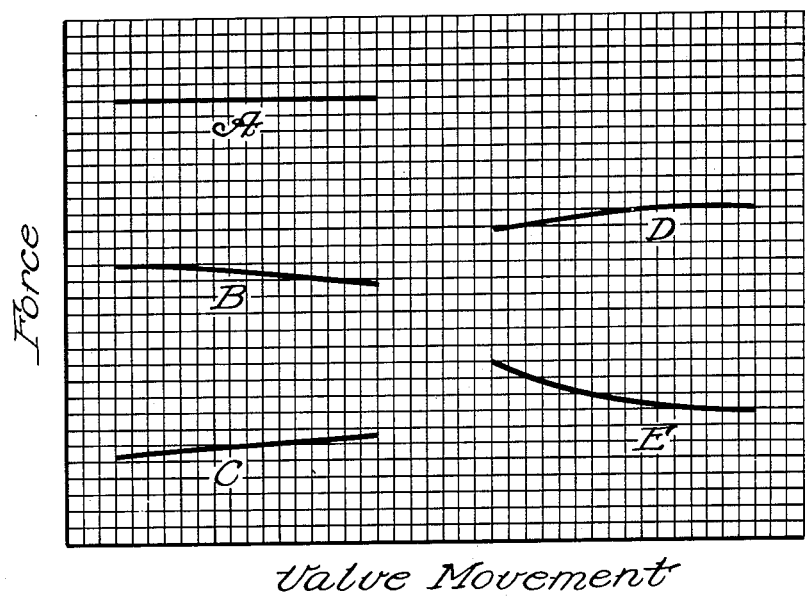
INVENTORS:
Irvin E. Wiegers
Harold E. Davis
By: Edward W. Weinert
Atty.

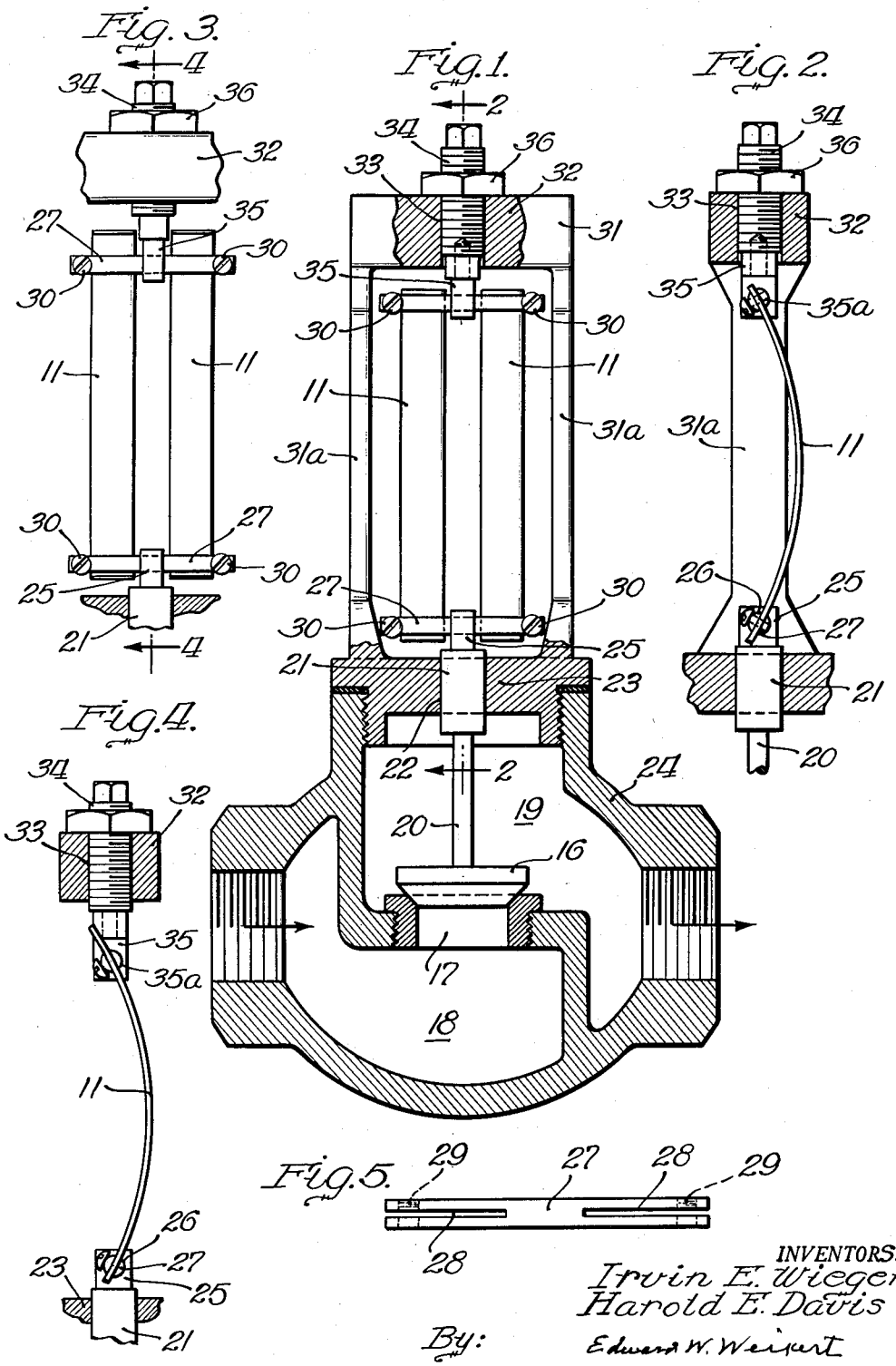

United States Patent Office 2,744,748
Patented May 8, 1956

2,744,748
ZERO SCALE SPRING

Irvin E. Wiegers and Harold E. Davis, Hamilton, Ohio, assignors to Hamilton-Thomas Corporation, Hamilton, Ohio, a corporation of Ohio Application December 22, 1952, Serial No. 327,247

5 Claims. (Cl. 267—1)

This invention relates to a zero scale spring and concerns itself with a columnar leaf spring which is subject to end thrust which deflects or bends the spring without increasing the force exerted by the spring.

The invention further includes the combination of such a columnar spring with a pressure regulating valve in which the columnar spring normally maintains the valve in closed position but will be deflected by excess pressure on the valve when opening the same without increasing the force exerted by the spring.

But such a columnar spring has many uses in places where it is desired to vary the position of a member such as a valve for maintaining a fixed pressure, since the force exerted by the columnar spring on the member will remain substantially constant while the position of the member may be changed.

Broadly, the invention contemplates any movable member subject to various fixed pressures which may change the position of such member from an initial position to a more remote position with a columnar spring normally holding such member in initial position and being deflectable without any appreciable increase in force during the movement of said member to a more remote position.

The invention further contemplates the incorporation of the columnar spring in adaptable organizations for effectively carrying out the functions and purpose of the invention.

The invention comprises the novel structure and combination of parts hereinafter described and more particularly pointed out and defined in the appended claims.

In the accompanying drawing which illustrates certain preferred forms of this invention and in which similar reference numerals refer to similar features in the different views:

Fig. 1 is a sectional view through a valve housing illustrating this invention applied to a valve subject to fluid pressure;

Fig. 2 is a sectional view taken upon the line 2—2 of Fig. 1 with parts in elevation;

Fig. 3 is a fragmentary elevational view illustrating an adjustable feature of the invention;

Fig. 4 is a sectional view taken upon the line 4—4 of Fig. 3 with parts in elevation;

Fig. 5 is a plan view of a columnar spring clamp involving a part of this invention;

Fig. 6 is an elevational view of a modified form of spring;

Fig. 7 is an elevational view of a further modified form of spring;

Figs. 8 and 9 illustrate columnar springs mounted in offset relation with respect to the line of thrust; and Fig. 10 is a graphic chart showing the actions of certain forms of springs involving this invention.

In referring now to the drawing, there is shown a columnar spring 11 which may consist of suitable spring metal. Normally, the springs are in the form of uniform flat strips of metal with parallel side edges and of suitable thickness so that they can be readily deflected in accordance with the duty they are required to perform. Such a columnar spring is adapted to produce a thrust having a zero scale as shown by the graph A in Fig. 10 due to the substantial constant force it exerts.

However, the scale of the spring can be varied by changing the form or profile of the leaves as shown in Figs. 6, 7 and 10. The form of spring shown in Fig. 6 in which the flat spring 12 has concave side edges 13 will produce an end thrust having a negative scale as shown at B in Fig. 10. In Fig. 7, there is shown a flat columnar spring 14 having convex side edges 15 which will produce an end thrust having a positive scale as shown by the graph C on Fig. 10. Other variations in the form of the spring may be resorted to as occasion requires.

In Fig. 1, the columnar spring 11 has been shown in connection with a valve 16 which controls a port 17 leading from a fluid inlet chamber 18 to a fluid outlet chamber 19. The valve 16 has a stem 20 which has a bearing cylinder 21 reciprocable in a bore 22 extending through the top 23 of the valve housing 24. The valve stem 20 has a projection 25 above the bearing cylinder 21, which projection has a bearing aperture 26 for receiving a cross bar 27 which can rotate or rock in such bearing aperture.

The cross bar 27 which is clearly shown in Fig. 5 is provided with slits 28 extending inwardly from the ends thereof for receiving the lower ends of columnar springs 11. Adjacent the ends of the cross bar 27 are screw holes 29 for receiving screws for clamping the spring plates therein. Thus upward movement of the valve for opening the port 17 due to the pressure therebeneath will elevate the cross bar 27 and buckle or deflect the springs 11. In the use of two leaf springs, a balanced force is asserted by the springs.

An open housing 31 extends from the top 23 of the valve housing 24. This housing comprises a pair of vertical legs 31a which carry a top block 32 which has a threaded opening 33 through which a threaded screw 34 having a lock nut 36 extends. A bearing plug 35 is carried by the lower end of the screw 34 and this bearing plug has a bearing aperture 35a for receiving a bar 27 in parallel relation to the lower bar 27. The upper bar 27 may rotate or rock in its bearing. The upper bar 27 carried by the adjustable screw 34 confines the upper ends of the leaf springs 11 in the slots 28 by screws 30. Thus the two columnar springs 11 are confined between the bars 27. When they are placed between the bars 27, they are slightly deflected or bowed and the initial force exerted arises from this initial deflection.

It is possible to vary the force exerted by the endwise thrust of the springs 11 by adjusting the effective length thereof as shown in Fig. 3. This is accomplished by means of the adjusting screw 34 which carries the upper bar 27. By rotating this screw, the upper bar 27 can be elevated or lowered when the screws 30 have been unscrewed to release the leaves 11. After the proper adjustment has been made the screws can be tightened to tightly clamp the spring leaves in place. In Fig. 3 it will be noted that the upper bar 27 has been lowered whereby the effective length of the springs have been shortened.

In Fig. 1 the springs have their mountings substantially in the plane of the thrust. However, the springs may have their mountings in planes offset to the thrust plane as shown in Figs. 8 and 9. In Fig. 8, the end portions of the springs 11a are secured to blocks 37 carried by bars 27a. The deflection of this spring 11a will produce a thrust having a characteristic as shown by the graph D in Fig. 10. In Fig. 9 there is shown a spring 11b which is mounted upon blocks 37 on bars 27a in offset relation thereto with the spring bowed inwardly and restrained in that position. The arrangement of spring 11b produces a thrust with a negative characteristic as shown at E on the graphic chart in the range where the thrust is high which occurs when the spring approaches its normal flat position.

In the use of columnar springs as applied in Fig. 1, the endwise thrust of the springs 11 maintains the valve 16 in closed position. When the fluid pressure against the valve 16 overcomes the force of the springs 11, the valve 16 will be opened. Elevation of the valve stem 20 through the opening of the valve will cause elevation of the lower bar 27 and cause the springs 11 to bow or become deflected. But this deflection of the springs 11 will not increase the endwise force or thrust of the springs so that the valve will remain under the sole pressure of the fluid. For the best results, the friction between the bars 27 and the parts 25 and 35 should be kept at a minimum.

For when a leaf spring is loaded as a column, the thrust is transmitted in a substantially endwise direction and will bow or deflect the leaf spring. This deflection of the spring will shorten the distance or chord between the ends; the more the spring is deflected, the shorter will be the chord. As the chord is decreased, the displacement of the spring, that is its bowed part, increases. Thus, the leverage with which the bending force is applied increases as the bend increases with the result that these forces substantially balance each other and the end thrust of the spring remains substantially constant.

It will be appreciated from the foregoing that the use of a flat spring to exert endwise pressure through deflection will not increase that pressure through increased deflection with the result that a substantially constant force will arise from the use of columnar springs, which is a notable advantage in many instances.

We are aware that many changes may be made and various details of construction may be modified without departing from the principles of this invention so we do not propose limiting the patent granted otherwise than necessitated by the appended claims.

I claim:

1. In an apparatus of the class described, a reciprocably mounted rod, a cross bar carried by said rod, a fixed support spaced from an end of said rod, an adjustable screw extending through said support, a cross bar carried by said screw, said cross bars having releasable clamping means and being arranged in spaced parallel relation with each other, leaf springs secured between said cross bars by said releasable clamping means whereby the effective length of said leaf springs may be varied.

2. In an apparatus of the class described, a reciprocably mounted rod, a cross bar secured to one end of said rod, said cross bar having slotted end portions, a fixed support, an adjustable member extending from said support coaxially with said rod and in spaced relation therewith, a cross bar carried by said adjustable member and having slotted end portions, said cross bars being arranged in spaced parallel relation with each other, slightly bowed leaf springs having their respective ends mounted in said slotted end portions and extending between said cross bars and adjustable means for securing the ends of said springs to said cross bars.

3. In an apparatus of the class described, a reciprocably mounted rod having a bearing portion, a bearing member having an aperture thru which said bearing portion extends, said rod having a bearing aperture beyond said bearing member, a cross bar rotatably mounted in said aperture, flat columnar springs having one of their ends in clamping engagement with the terminal portions of said cross bar, a support spaced from said bearing member and in parallel relation therewith, an adjustable screw extending thru said support and having an aperture inward of said support, a second cross bar rotatably mounted in said last mentioned aperture in parallel relation with the first mentioned cross bar, said cross bar last mentioned having terminal slots for receiving the other ends of said flat springs, releasable screws for clamping said other ends of said springs in said slots whereby by releasing said last mentioned screws and adjusting said adjustable screw said second cross bar may be adjusted relative to said springs for varying the effective length of said springs.

4. In an apparatus of the class described, a reciprocably mounted rod, said rod having an aperture, a cross bar extending thru said aperture for rotatable and rockable movements, said cross bar having terminal slots, a fixed support above said cross bar, an adjustable screw extending thru said support and having a tip at its lower end, said tip having an aperture, a second cross bar rotatably and rockably mounted in said second mentioned aperture in parallel relation with the first cross bar, said second cross bar having terminal slots, flat columnar springs mounted between said cross bars and having their terminal portions in said slots of said cross bars, releaseable screws extending thru the slotted ends of said cross bars for clamping the springs thereto whereby by releasing the screws in the second cross bar and operating said adjustable screw the said second cross bar may be adjusted relative to said springs for varying the effective length thereof.

5. In an apparatus of the class described, a first cross bar, a second cross bar in parallel relation to the first cross bar, a reciprocably mounted rod having a connection with the first cross bar, means for guiding a part of said connection, a fixed support, an adjustable screw in said support having a connection with said second cross bar, a pair of flat columnar springs clamped at one of their ends to the first cross bar, said second cross bar having terminal slots into which the other ends of said springs extend, releasable screws extending thru the slotted ends of said second cross bar for clamping the springs thereto whereby upon releasing the last mentioned screws and adjusting said adjustable screw said second cross bar may be shifted relative to said springs for varying the effective length thereof.

References Cited in the file of this patent

FOREIGN PATENTS

| 60,787 | Germany | Feb. 18, 1892 |
| 267,920 | Germany | Dec. 3, 1913 |
| 472,251 | Great Britain | Sept. 15, 1937 |
| 617,076 | Great Britain | Feb. 1, 1949 |